US011662256B2

(12) United States Patent
Costello et al.

(10) Patent No.: US 11,662,256 B2
(45) Date of Patent: May 30, 2023

(54) THERMOCOUPLE PRE-AGING AND TEMPERATURE DRIFT COMPENSATION

(71) Applicant: Rolls-Royce Corporation, Indianapolis, IN (US)

(72) Inventors: John Joseph Costello, Indianapolis, IN (US); Robert C. Dalley, Waldron, IN (US); Kenneth L. Graham, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 356 days.

(21) Appl. No.: 16/887,746

(22) Filed: May 29, 2020

(65) Prior Publication Data

US 2021/0372858 A1  Dec. 2, 2021

(51) Int. Cl.
*G01K 7/00* (2006.01)
*G01K 7/02* (2021.01)

(52) U.S. Cl.
CPC .................... *G01K 7/021* (2013.01)

(58) Field of Classification Search
CPC combination set(s) only.
See application file for complete search history.

(56) References Cited

U.S. PATENT DOCUMENTS

| 6,098,473 A | * | 8/2000 | Hafner | G05D 23/1919 |
| | | | | 198/817 |
| 8,220,990 B2 | * | 7/2012 | Mitchell | G01D 11/24 |
| | | | | 374/57 |
| 2009/0290614 A1 | | 11/2009 | Gregory et al. | |
| 2012/0213250 A1 | | 8/2012 | Snyder | |

OTHER PUBLICATIONS

Richard Skifton et al. "Optimization of heat treatment and calibration procedures for high temperature irradiation resistant thermocouples", Instrumentation Science and Technology, vol. 46, No. 4, pp. 349-363, 2018. (Year: 2018).*
Pearce et al. "A systematic investigation of the thermoelectric stability of Pt—Rh thermocouples between 1300 °C and 1500 °C", Metrologia 55, pp. 558-567, 2018. (Year: 2018).*
Rita Kriūkiene, "High Temperature Oxidation of Thin Chromel-Alumel Thermocouples", Jun. 2004, 136-141 (7 pages).
(Continued)

*Primary Examiner* — Lisa M Caputo
*Assistant Examiner* — Nasir U. Ahmed
(74) *Attorney, Agent, or Firm* — Crowell & Moring LLP

(57) ABSTRACT

A temperature drift compensation method includes pre-aging a thermocouple, during which the thermocouple is subjected to temperatures and/or pressures that cause or facilitate an oxidation growth on the conductor elements of the thermocouple. During the pre-aging, temperature readings of the thermocouple are recorded, and a model including a time-based exponential expression is derived from the temperature readings. In addition, a temperature sensor system includes a pre-aged thermocouple, and a temperature compensation circuit that modifies initial temperature readings from the pre-aged thermocouple according to a model including a time-based exponential expression.

20 Claims, 6 Drawing Sheets

(56) References Cited

OTHER PUBLICATIONS

N.A. Burley, Department of Supply—Australian Defence Scientific Service, Defence Standards Laboratories, Maribyrnong, Victoria, Report 522, "The Passivation of Nickel-Base Thermocouple Alloys and Some Related Topics", Aug. 1972, (27 pages).

Robert Torgerson, "Aging and Drift in Type K Themocouples", Jan. 2, 2019, https://blog.wika.us/knowhow/aging-and-drift-in-type-k-thermocouples/; (6 pages).

Joris de Hoog et al., "Combining an Electrothermal and Impedance Aging Model to Investigate Thermal Degradation Caused by Fast Charging", Feb. 14, 2018, Energies 2018, 11, 804; doi:10.3390/en11040804; www.mdpi.com/journal/energies (15 pages).

C.D. Starr et al., "Effect of Oxidation on Stability of Thermocouples", 1963, 1185-1194 (10 pages).

* cited by examiner

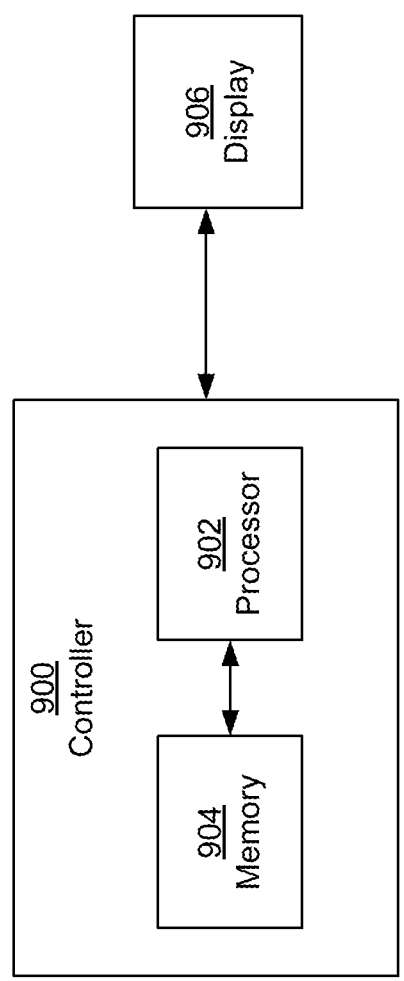

THERMOCOUPLE PRE-AGING AND TEMPERATURE DRIFT COMPENSATION

TECHNICAL FIELD

This disclosure relates to gas turbine engines and, in particular, to compensating for temperature drift in thermocouple measurements.

BACKGROUND

Gas turbine engines include temperature sensors to monitor temperature within the engine. Accurately measuring temperature within the engine is critical for optimal engine performance and preventing against destruction and damage of engine parts. However, in implementation, the way that a temperature sensor measures temperature may change over time, a phenomenon called temperature drift. Relatively high operating temperatures of an engine (e.g., 1000 degrees Celsius) may augment the drift, causing temperature sensors to measure temperature outside of acceptable ranges, which can lead to sub-optimal engine performance and destruction/damage of engine parts. As such, ways to improve temperature sensor measurements, particularly for those temperature sensors measuring temperature at relatively high temperatures over prolonged periods of time, may be desirable.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 9 is a block diagram of an example controller.

DETAILED DESCRIPTION

Figure 1:
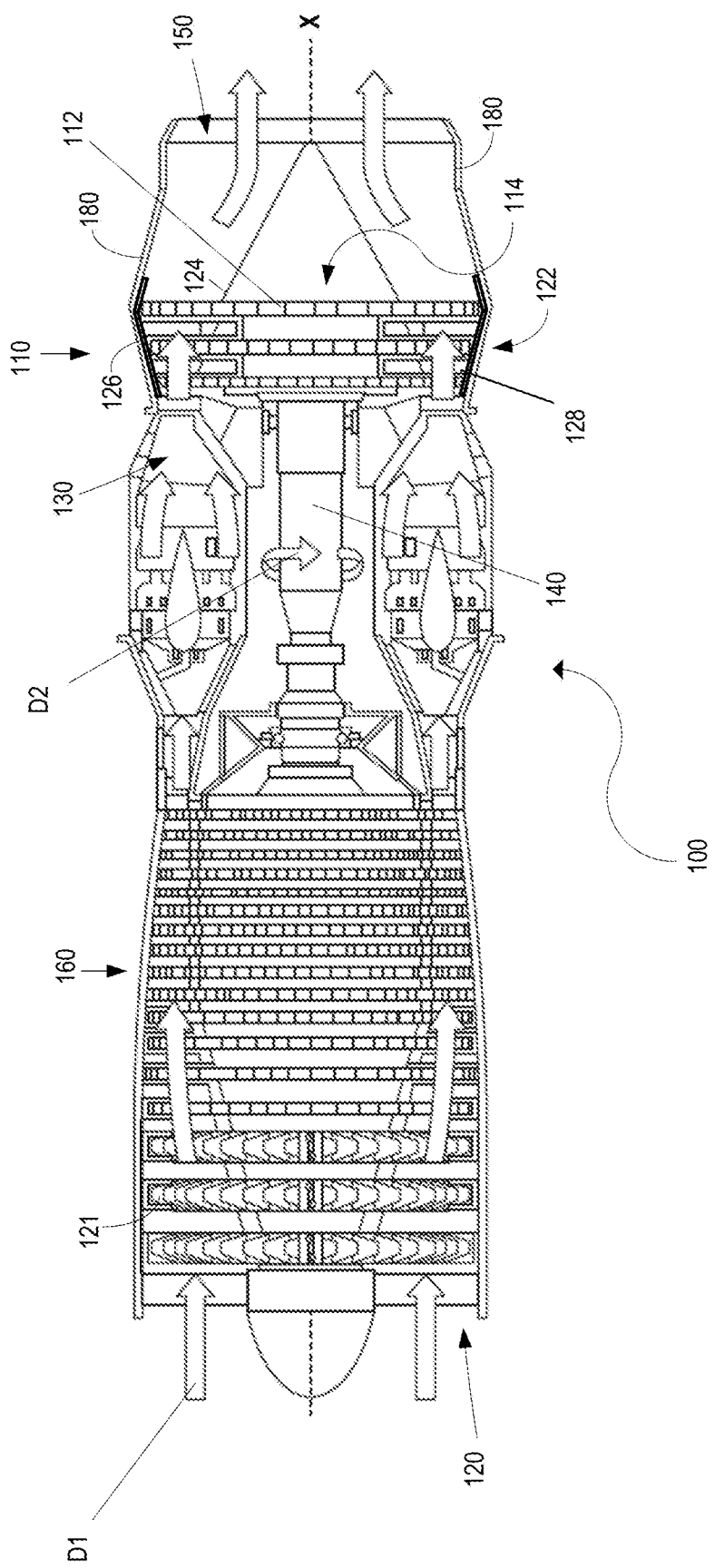
FIG. 1 is a cross-sectional view of a gas turbine engine.

By way of an introductory example, a thermocouple drift compensation method includes: positioning a thermocouple in a chamber; during a pre-aging time period that the thermocouple is positioned in the chamber: controlling a temperature of the chamber; and recording a plurality of temperature readings of the thermocouple at a plurality of times during the pre-aging time period; calculating a temperature drift of the thermocouple over the pre-aging time period based on the plurality of temperature readings; determining a model of the calculated temperature drift, the model comprising a time-based exponential expression; and configuring a thermocouple compensation circuit with the model.

As another introductory example, a temperature sensor system includes: a pre-aged thermocouple comprising an oxidation layer, the pre-aged thermocouple configured to generate an initial temperature reading; and a temperature drift compensation circuit configured to: receive the initial temperature reading from the pre-aged thermocouple; modify the initial temperature reading to generate a modified temperature reading, the modification according to a time-based exponential expression; and output the modified temperature reading.

An interesting feature of the systems and methods described below may be that model including a time-based exponential expression, such as but not limited to a parabolic expression, is used to compensate for thermocouple temperature drift.

Another interesting feature of the systems and methods described below may be that a thermocouple, before it is implemented in a field of operation, is pre-aged in a chamber for a time period, during which the thermocouple is subjected to temperatures and/or pressures, including gas species or other elemental compounds, that may cause an oxidation layer to form on the conductors of the thermocouple. This way, when the thermocouple is first implemented into a field of operation, it already has an oxidation layer intentionally formed from a pre-aging process. Such an oxidation layer (which may comprise nickel oxide, silicon dioxide, or other oxide materials further described below), may form or function as a protective layer that prevents additional, unwanted oxidation, such as chromium oxide or other compounds with Seebeck components.

Another interesting feature is that the time-based exponential expression that a temperature sensor system uses to compensate for temperature drift of a thermocouple may be derived from the same or a similar pre-aging process that the thermocouple was subjected before being implemented in the field.

Another interesting feature of the systems and methods described below may be that the time-based exponential expression model that a temperature sensor system uses to compensate for temperature drift may provide more accurate temperature readings compared to linear models that model temperature drift. Such time-based exponential express models may be more accurate over a wider range of temperatures and over a longer lifespan of a thermocouple.

Another interesting feature is that the time-based exponential expression model used for temperature drift compensation may be especially beneficial for thermocouples operating in relatively harsh environments, such as those with long operating times (hundreds or thousands of hours), and/or those that sense temperatures in relatively high temperature environments (e.g., greater than 800 degrees Celsius), and that have a requirement to measure temperature with a relatively high degree of accuracy, such as within 1% error. Among the types of thermocouples operating in such environments for which the time-based exponential expression model for temperature drift compensation may include Type K thermocouples and/or thermocouples with Class 1 thermocouple materials.

Another interesting feature of the systems and method described below is that the life of a thermocouple may be prolonged due to more accurate temperature drift compensation over longer operating durations.

These and other interesting features are described in further detail with reference to various embodiments described below and the attached drawings.

FIG. 1 is a cross-sectional view of a gas turbine engine 100. In some examples, the gas turbine engine 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted as an axial flow engine, in some forms the gas turbine engine 100 may have multiple spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. During operation of the gas turbine engine 100, a main fluid received from the intake section 120, such as air, travels through a main fluid flow path in a main fluid flow path direction D1 through blades 121 in the intake section 120. As shown in FIG. 1, the main fluid flow path direction D1 is generally parallel with a centerline X of the engine 100. The fluid may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted previously, the hot, high pressure fluid passes through the turbine section 110 during operation of the gas turbine engine 100. As the fluid flows through the turbine section 110, the fluid passes between adjacent turbine blades 112 of the turbine 114 causing the turbine 114 to rotate. The rotating turbine 114 may turn a shaft 140 in a rotational direction D2, for example. The turbine blades 112 may rotate around an axis of rotation, which may correspond to a centerline X of the turbine 114 in some examples.

The turbine blades 112 may be distributed in an array of blades 122 circumferentially spaced around a hub 124 (or core or turbine spool) of the turbine 114. Circumferentially surrounding the array of blades 122 is a blade track system 126. The blade track system 126 is designed to track outer edges or tips of turbine blades 112 included in the array of blades 122 as the blades 112 radially expand and contract, due to, for example, rotation of the hub 124 causing centrifugal force, and/or changes in temperature causing materials to expand and contract.

The turbine section 112 may also include one or more vane stages 128. A vane stage (also called a vane assembly) 128 is a component that directs the flow of fluid through at least a portion of the turbine section 112. Example types of a vane stage 128 include an inlet vane stage and an exhaust vane stage, although other types of vane stages may be possible. A vane stage 128 includes a plurality of vanes (also called vane segments) connected together. Like a vane stage as a whole, each vane segment, or a combination of two or more vane segments, is configured to direct the flow of fluid through at least a portion of the turbine section 112.

Surrounding the blade track system 126 and the vane stage(s) 128 is a turbine casing 180. The blade track system 126 and the vane stage(s) 128 are positionable axially with the centerline X within the turbine casing 180 and radially outward of the turbine blades 112. The blade tracks may be dynamically radially moved outwardly and inwardly by the blade track system 126 in response to dynamic operation of the gas turbine engine 100 to avoid/control a rub of the tip of the turbine blades 112 on the segments of the blade tracks.

Although not shown in FIG. 1, the engine 100 may include at least one thermocouple positioned therein and configured to sense or measure a temperature of a given feature of the engine 100. Example features include a particular one or more sections of the engine 100 (e.g., the turbine section 110, the intake section 120, the combustion section 130, the exhaust section 150, and/or the compressor section 160), particular parts or stages of a given section, and/or air or fluid flowing through a particular section, or a particular part of a particular section, of the engine 100.

In various embodiments, the at least one thermocouple includes a plurality of thermocouples, such as an array of thermocouples, each configured to measure a temperature of the engine feature. The plurality of thermocouples may be integrated with an averaging component (e.g., an electronic device or circuit configured to perform an averaging function) that receives a plurality of measured temperature readings from the thermocouple array, and averages the measured temperature readings to output an average temperature of the feature.

As described in further detail below, the engine 100 may include, or otherwise be coupled to, an engine controller that is configured to control one or more functions of the engine, including one or more functions based on measured temperature readings from one or more thermocouples and/or one or more arrays of thermocouples. One example function is fuel delivery. The engine controller may control a rate of fuel delivered to the combustion section 130 based on a measured temperature, such as a measured temperature of exhaust gas in the exhaust section 150, as an example.

Additionally, a thermocouple within the engine 100 may experience temperature drift, which is the change in how a thermocouple measures temperature over time. In general, a thermocouple is configured to provide or output a temperature reading, such as in the form of a voltage, over a range of levels or magnitudes corresponding to a range of temperatures. During operation at a given point in time, a thermocouple may generate an output at a given level corresponding to a given temperature that the thermocouple is reading for that given point in time.

A temperature controller or reader may receive the thermocouple output from a thermocouple (or an averaged output from an array of thermocouples), detect the level of the output, and based on the detected output, determine or calculate a temperature of the feature that the thermocouple is measuring.

Ideally, a given thermocouple is configured or designed to generate its thermocouple outputs at levels that match predetermined or expected levels that correspond to temperatures within the temperature range. When a thermocouple is doing so, the thermocouple is perfectly or accurately reading or measuring a temperature of the engine feature. As a result, the temperature controller may correctly identify the actual temperature of the engine feature, and in turn optimally control the engine function.

On the other hand, when a thermocouple is outputting its thermocouple output at levels that do not match predetermined or expected levels, it is not perfectly or accurately reading or measuring temperature. As a result, the temperature controller incorrectly or erroneously identifies the actual temperature of the engine feature.

An amount by which a thermocouple output deviates from its corresponding expected level is an amount of temperature error with which the thermocouple is operating. A given temperature error may be for a single particular temperature, or may be for a given range of temperatures, such as a range of temperatures of a thermal cycle extending between given low and high temperature levels.

In practical implementation, an amount of non-zero temperature error is anticipated, and acceptable for sufficiently optimal and/or healthy engine performance if within a certain range or margin of acceptable temperature errors. Conversely, a thermocouple generating thermocouple outputs at erroneous levels outside of an acceptable error range can lead to suboptimal engine performance. As such, a thermocouple generating thermocouple outputs outside of an acceptable error range may need to be replaced with a new thermocouple.

As an example, in various gas turbine engine applications, a thermocouple, at some point during operation, may measure relatively high temperatures around 1,000 degrees Celsius within an error of about 2-5%, or about 35-40 degrees Celsius, from the actual temperature. Such an amount of error may be outside an acceptable error range, leading to a need to replace the thermocouple.

The level at which a thermocouple generates an output for a given temperature, or generally the amount of temperature error with which the thermocouple generates its output, may change over time. In other words, the temperature drift of a thermocouple may change over time. In particular embodiments, the amount of thermocouple drift increases over time. As a consequence of the increase, the thermocouple may start its lifecycle by generating its output within an acceptable error range, but at some point, may begin generating its output outside of the acceptable error range.

The more accurate that the temperature drift can be predicted over the life of a thermocouple, the more accurately a temperature controller can determine an actual temperature of an engine feature being measured. If the temperature drift can be sufficiently predicted over a time period longer than the time at which the thermocouple begins generating an output outside the acceptable error range, such as through analytical modeling, the life of the thermocouple can be extended.

The present description describes systems, apparatuses, and methods for temperature drift compensation. In various embodiments, a temperature drift compensation method or process includes a pre-aging process or phase, during which a thermocouple is subjected to temperatures and pressures in a controlled environment, such as a chamber, which cause or facilitate an oxidation growth on conductor elements of the thermocouple. During the pre-aging process, the temperature measurements from the thermocouple measuring the temperature in the chamber are recorded. Subsequently, during a temperature drift modeling process (or a temperature drift modeling phase of the temperature drift compensation process), a temperature drift model that models temperature drift as a function of time is determined based on the temperature measurements. The model may include a time-based exponential expression, which may be due, at least in part, to creating an oxide layer on the conductor elements of the thermocouple.

Upon creation of the model, an integration process (or an integration phase of the temperature drift compensation process) may be performed, during which the model may be integrated or configured with a drift compensation circuit that modifies or adjusts temperature readings from a thermocouple. The thermocouple may be the same as, or different from, the thermocouple from which the model was derived. Even if the thermocouple is different than the one from which the model is derived, the thermocouple is similarly subjected to the pre-aging process in the chamber before it is implemented in an intended field of operation with the model.

Upon configuring a drift compensation circuit with the model, the drift compensation circuit may operate in an intended field of operation, such as a gas turbine, with one or more thermocouples. During operation, the drift compensation circuit modifies initial temperature readings from a thermocouple according to the model. To do so, the drift compensation circuit may determine a temperature adjustment amount that corresponds to an effective operating time, where the effective operating time is determined from or relative to an end time of the pre-aging process. That is, the drift compensation circuit may determine or calculate an effective operating time to be based on a sum of the time duration that the thermocouple was subjected to the pre-aging process and a time duration during which the thermocouple is operating in its field of operation.

Through modification of the initial temperature readings, the drift compensation circuit may output modified temperature readings that more closely match expected temperature readings compared to if temperature modification was not performed. Also, by using a model that includes a time-based exponential expression, the drift compensation circuit may more closely compensate for drift compared to other drift compensation circuits, such as ones that compensate for drift linearly.

Figure 2:
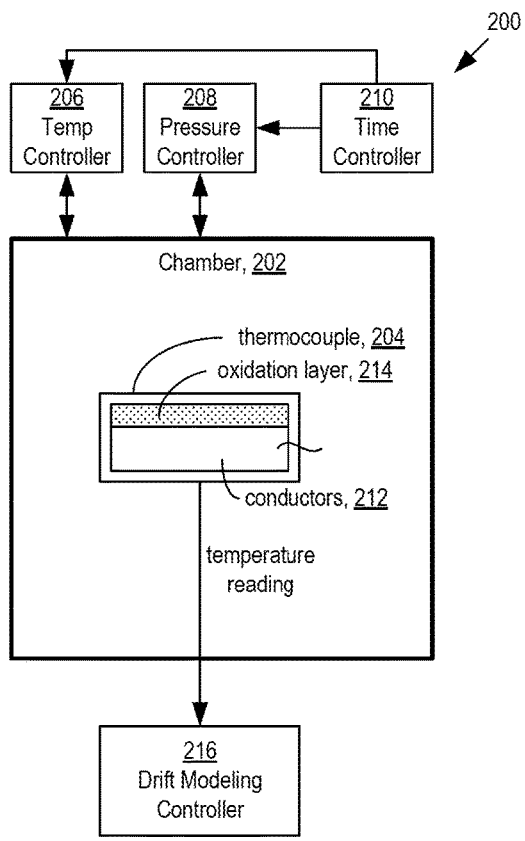
FIG. 2 is a partial block diagram of an example test setup configured to perform a pre-aging process for a thermocouple.
Figure 4:
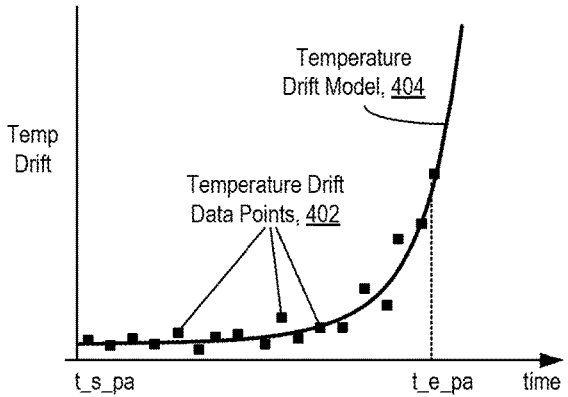
FIG. 4 is a plot of example temperature drift data points and a temperature drift model best fit to the temperature drift data points.
Figure 3:
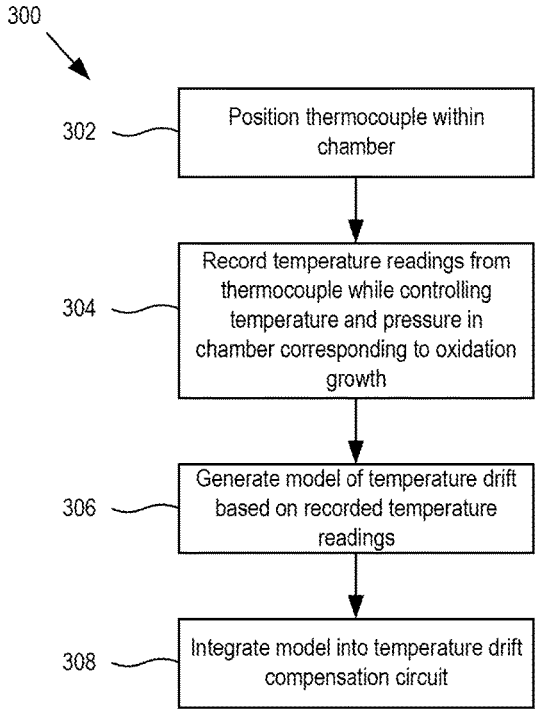
FIG. 3 is an example method of performing a pre-aging process.

FIG. 2 is an example test setup 200 configured to conduct or perform pre-aging and temperature drift modeling processes or phases of a thermocouple manufacturing method. FIG. 3 is an example temperature drift compensation method 300 performed, at least in part, by the test setup 200. FIG. 4 is an example temperature drift model generated from temperature drift data obtained from a pre-aging process, and/or during a temperature drift compensation method, such as the temperature drift compensation method 300.

Referring to FIG. 2, the test setup 200 may include a chamber 202, which is generally a structure that defines an internal area (or volume) in which a thermocouple 204 can be positioned and in which a temperature and/or pressure of the area can be controlled. The test setup 200 may further include a temperature (temp) controller 206 that is configured to control, set, and/or adjust an environmental or ambient temperature within the chamber 202. In addition, for at least some example embodiments, the test setup 200 may include a pressure controller 208 that is configured to control, set, and/or adjust a pressure within the chamber 202. In particular example embodiments, the pressure controller 208 is configured to control, set, and/or adjust a partial pressure of oxygen. Additionally, in various embodiments, the test setup 200 may include a timer or time controller 210 that may be configured to control various timing aspects of a pre-aging process, such as starting and stopping the pre-aging process, including times at which the temperature controller 206 sets the environmental temperature to certain temperature values and/or at which the pressure controller 208 sets the pressure to certain pressure amounts.

The thermocouple 204 may include a set or pair of conductors (or conductive elements) 212 that respond differently from each other in response to temperature in order to generate a temperature reading or output, such as in the form of a voltage. Various materials of the conductive elements may be possible. As a non-limiting example, the thermocouple 204 may be a Type K thermocouple that includes a pair of conductors, one conductor made of Chromel® and the other conductor made of Alumel®. In addition or alternatively, the conductors 212 may be made of a particular class of materials, such as Class 1 materials. As described in further detail below, during a pre-aging process, a layer of oxide (or oxidation layer) 214 may form on the conductors 212 in response to the temperature and pressure controlled in the chamber 202.

In addition, the setup 200 may include a drift modeling controller 216 electrically coupled to the thermocouple 204 and configured to receive a temperature reading or output from the thermocouple 204. For example, the drift modeling controller 216 may be configured to sample or otherwise determine levels of the thermocouple output at various points in time during the pre-aging process to obtain a plurality of data points of the thermocouple output. For each data point, the drift modeling controller 216 may determine an associated measured temperature value and/or an associated temperature drift value, such as by comparing the measured temperature value with an actual temperature value, which may be known to the drift modeling controller 216 as part of the pre-aging process.

Upon determining a set of temperature drift data points over the time period of the pre-aging process, the drift modeling controller 216 may be configured to determine a model of the temperature drift, which may be a curve and/or a mathematical function that models or best fits the set of temperature drift data points. For example, the model may be temperature drift as a function of time, yielding given temperature drift values for given time inputs. The model may extrapolate temperature drift values for times beyond the times of the pre-aging process. For example, if the pre-aging process ends after 50 hours, the model derived from the pre-aging process identifies, or extrapolates for, temperature drift values for the thermocouple beyond 50 hours.

As described in further detail below with respect to the temperature drift compensation method 300, the temperature controller 206 and pressure controller 208 may set temperature and pressure levels during a pre-aging process or phase of the method 300 in order to intentionally or deliberately grow oxide, or form the oxidation layer 214, on the conductors 212 of the thermocouple 204. The combination of temperature and pressure levels used may correspond to a particular material of the oxide layer 214 to grow. That is, the temperature and pressure levels used or chosen for the pre-aging process are known or predetermined to cause oxidation reactions on the conductors of a predetermined material. Non-limiting example materials for the oxidation layer 214 include nickel oxide (NiO), nickel-hydroxide (Ni(OH)$^2$), silicon-dioxide (SiO$_2$), or chromium oxide (Cr$_2$O$_3$). In various embodiments, the temperature and pressure levels set inside the chamber 202 may be the same as or similar to the temperatures the thermocouple 204 would experience when implemented in its intended operating environment (such as in a gas turbine engine), and/or those that form a material of the oxide layer 214 that the same as the oxide material that typically forms on the conductors 212 when the thermocouple 204 is subjected to similar temperature and/or pressure levels when implemented in its intended operating environment.

The oxide layer 214 forming on the conductors 212 may cause an overall resistance of the conductors 212 and oxide layer 214 to increase over time by an amount proportional to a time-based exponential expression. In particular embodiments, the time-based exponential expression due to formation of the oxide layer 214 may represent an increased resistance according to a parabolic rate law.

In addition, as used herein, a time-based exponential expression is a mathematical expression that includes a base component and an exponent component, and that further includes a time component as an input variable, where the time component is at least one of the base component or the exponent component. A first example time-based exponential expressions is $t^C$, and a second example time-based exponential is $C^t$. In the first example, a time component t is part of the base component, and a constant value C is part of the exponent component. In the second example, the constant value C is part of the base component, and the time component t is part of the exponent component.

Additionally, in general for thermocouple technology, the Seebeck coefficient, and in turn the Seebeck electromotive force (EMF), are each a function of, or dependent on, the elemental resistance of the conductors 212. As such, by forming the oxide layer 214 on the conductors 212, the Seebeck coefficient and the Seebeck EMF may each be a function of time that changes according to a time-based exponential expression.

Moreover, the temperature reading that the thermocouple 204 outputs is a function of, or dependent on, the Seebeck coefficient and/or the Seebeck EMF. As such, subjecting the thermocouple 204 to temperatures and/or pressures in the chamber 202 during the pre-aging process in order to form the oxide layer 214 may cause or facilitate the thermocouple 204 to have a temperature drift that changes as function of time according to, or that similarly resembles, a time-based exponential expression.

Under this notion, when the drift modeling controller 216 is generating the temperature drift model, the drift modeling controller 216 may determine the temperature drift model to include a time-based exponential expression. In particular example embodiments, for a given set temperature drift data points, the drift modeling controller 216 may be configured to determine at least one constant value associated with the time-based exponential expression that provides a model that best fits the measured temperature drift data points. In various embodiments, the at least one constant value includes at least one of: a constant value B of a base component, a constant value C of an exponent component, or a constant value D of a multiplier by which the exponential expression is multiplied. Accordingly, non-limiting examples of models that the drift modeling controller 216 may determine include: $D(B^t)$, $D(t^C)$, $D((B+t)^C)$, or $D(B^{t+C})$. Also, in general, each of the constant values are rational or irrational values. For example, in various embodiments, the constant value B of the base component may be the base of the natural logarithm e, approximately equal to 2.71828. Also, in various embodiments, the model may include multiple (more than one) time-based exponential expressions separated by an operand, such as $D1(t^{C1})+D2(t^{C2})$ as a non-limiting example, where D1, D2, C1, and C2 are each constant values. In addition or alternatively, the model including a time-based exponential expression is a polynomial function or a parabolic function having at least one exponential expression that includes a time component as part of a base component or an exponent component of the at least one exponential expression.

To illustrate, FIG. 4 shows a plot of time drift data points 402 for several times during a pre-aging phase starting at a pre-aging start time t_s_pa and ending at a pre-aging end time t_e_pa. The drift modeling controller 216 may determine the time drift data points 402 in response to receipt of the thermocouple output from the thermocouple 204. Upon determining the time drift data points 402, the drift modeling controller 216 may determine a curve or mathematical function that includes a time-based exponential expression, as previously described. As part of the modeling process, the drift modeling controller 216 may determine one or more constant values associated with the time-based exponential expression to determine the curve or mathematical function 404 that best fits the temperature drift data points 402.

Further details of the pre-aging and temperature drift modeling processes is now described with reference to the temperature drift compensation method 300 of FIG. 3, and with reference to the test setup 200 of FIG. 2. Blocks 302 and 304 describe a pre-aging process, or a pre-aging phase of the temperature drift compensation method. Block 306 describes a temperature drift modeling process, or a temperature drift modeling phase of the temperature drift compensation method. Block 308 describes a model integration process, or a model integration phase of the temperature drift compensation method.

In further detail, at block 302, the thermocouple 204 is positioned within the chamber 202. At block 304, a pre-aging process during a pre-aging time period may be performed for the thermocouple 204 positioned in the chamber 202. In various embodiments, the pre-aging time period is on the order of hours, such as tens or hundreds of hours, although other units of time to define the pre-aging time period may be possible. For some embodiments, the pre-aging time period is greater than or equal to 36 hours. In various embodiments, the pre-aging time period is in a range of about 48 hours to 120 hours. In other embodiments, the pre-aging time period is in a range of about 72 hours to 96 hours. Various other durations of the pre-aging time period may be possible.

In addition, during the pre-aging time period, the temperature controller 206 may control a temperature within the chamber 202 to one or more predetermined temperature levels. In some embodiments, the temperature controller 206 may keep the temperature at a constant level during the pre-aging time period. In other embodiments, the temperature controller 206 may adjust the temperature to different temperature levels, such as at predetermined times and/or according to a predetermined pattern identifying temperature levels within the chamber 202 at predetermined times, such as to perform one or more thermal cycles, during the pre-aging time period. For some example embodiments, the temperature controller 206 may control the temperature during the pre-aging time period to a temperature level greater than or equal to 500 degrees Celsius. For at least some of these embodiments, the temperature controller 206 may control the temperature to within a range of about 800 degrees Celsius to 1200 degrees Celsius. In other embodiments, the temperature controller 206 may control the temperature to within a range of about 900 degrees Celsius to 1000 degrees Celsius. Other temperature levels or ranges of temperature levels to which the temperature controller 206 controls the temperature in the chamber 202 may be possible.

In addition, for at least some embodiments, the pressure controller 208 controls the pressure in the chamber 202 during the pre-aging time period. In particular embodiments, the pressure that the pressure controller 208 controls is, or includes, a partial pressure of oxygen of the atmosphere in the chamber 202.

The temperature level (or range of temperature levels) and the pressure level (or range of pressure levels) to which the temperature and pressure are set in the chamber 202 may correspond to those known to cause growth of a certain material of the oxidation layer 214 on the conductors 212 in the chamber 202 during the pre-aging time period. For example, certain combinations of temperature and partial pressure of oxygen may yield oxidation growth of certain materials. Depending on a desired material of the oxidation layer 214 to form during the pre-aging process may determine the combination of temperature and pressure levels to which the temperature and pressure within the chamber 202 are set during the pre-aging time period. As mentioned, non-limiting examples of the oxide material include nickel-oxide (NiO), nickel-hydroxide (Ni(OH)$^2$), silicon-dioxide (SiO$_2$), or chromium oxide (Cr$_2$O$_3$).

In addition, in various embodiments, the pre-aging process may be performed using the time controller 210, which determines a start time and an end time of the pre-aging time period. In various embodiments, the time controller 210 may control the timing at which the temperature controller 206 and/or the pressure controller 208 set and/or adjust the temperature and/or pressure within the chamber 202. For at least some embodiments, the pre-aging time period is a predetermined time period independent of an amount, such as a measured amount, of oxidation growth of the oxidation layer 214. For example, the pre-aging process may be a certain number of hours. Once the certain number of hours has elapsed, the pre-aging process ends, irrespective of how much oxidation has grown on the conductors 212. In other example embodiments, the duration of the pre-aging time period, or the pre-aging process ends, based on a predetermined amount of oxidation growth. That is, the pre-aging process continues until an amount (e.g., a thickness) of the oxidation layer 214 reaches a predetermined threshold level.

In addition, during the pre-aging time period, the thermocouple 204 may output a thermocouple output or temperature reading, such as in the form of a voltage, at a level indicative of the temperature it is reading or sensing. The drift modeling controller 216 may receive the thermocouple output, and record or sample the thermocouple output at various times to obtain a plurality of recorded or sampled temperature readings of the thermocouple during the pre-aging time period.

The drift modelling controller 216 may calculate a temperature drift of the thermocouple 204 over the pre-aging time period based on the plurality of temperature readings. For example, the drift modeling controller may convert the plurality of sampled temperature readings to a plurality of temperature drift data values (such as the temperature drift data points 402 in FIG. 4) that each indicate a temperature drift of the thermocouple 204 at the time at which the associated temperature reading was sampled, such as by determining a difference between the sampled or actual temperature readings and the expected temperature readings. The different or drift may be quantified in any of various units, such as degrees (e.g., degrees Celsius) or volts, as non-limiting examples.

At block 306, the drift modeling controller 216 may determine a model of the calculated temperature drift as a function of time. As previously described, the model may be a best fit curve or equation that best fits the calculated temperature drift data. The model may include a time-based exponential expression associated with one or more constant values. Accordingly, part of determining the model may include determining the one or more constant values, including one or more of a constant value of a base component of the time-based exponential expression, a constant value of an exponent component of the time-based exponential expression, or a constant value of a multiplier by which the time-based exponential expression is multiplied, as previously described.

At block 308, the model determined by the drift modeling controller 216 may be implemented or integrated into a temperature drift compensation circuit. In general, a temperature drift compensation circuit is an electronic component, such as an electronic device or circuit, configured to modify an initial temperature reading from a thermocouple based on, or according to, a temperature drift model. The temperature drift compensation circuit may output a modified temperature reading in response to modifying the initial temperature reading. The modification is performed in order to compensate for, or offset, the temperature drift over time of a thermocouple electrically coupled to the temperature drift compensation circuit.

A temperature drift compensation circuit may be configured with the temperature drift model at block 308 in any of various ways. For some embodiments, a temperature drift compensation circuit may be, or may be part of, a chip or integrated circuit, such as one that can be integrated within a housing of a thermocouple. For such embodiments, digital logic circuitry or other circuitry, such as in the form of an application specific integrated circuit (ASIC) or field programmable gate array (FPGA), may be used to implement the model including the time-based exponential expression. For other embodiments, a temperature drift compensation circuit may be in the form of a computer processor executing software including the model stored in a memory. To determine a modified temperature value, the computer processor accesses the memory and executes the software. Various ways of configuring a temperature drift compensation circuit with a model at block 308 may be possible.

Other embodiments of a temperature drift compensation method, different from the method 300 of FIG. 3, are possible. For example, where a temperature drift compensation model is already created, and a temperature drift compensation circuit incorporating the model is already manufactured, a temperature drift compensation method for a thermocouple may be performed using blocks 302 and 304 without generating or integrating the model at blocks 306 and 308. At the end of a pre-aging process for a thermocouple (at the end of block 304), the thermocouple is, at that time, pre-aged, and the pre-aged thermocouple is coupled with a temperature drift compensation circuit incorporating a temperature drift compensation model including a time-based exponential expression. The model may be derived from a different thermocouple, but one that is similar or of the same type, and that was similarly subjected to the pre-aging process.

Additionally, upon configuring a temperature drift compensation circuit with a time-drift compensation model, the temperature drift compensation circuit may perform temperature modification during an operation time period of a thermocouple, following a pre-aging process to which the thermocouple is subjected. During the operation time period, a thermocouple that is coupled to the temperature drift compensation circuit is operating in an intended operating environment, such as within a turbine engine.

To modify an initial temperature reading according to the model, a temperature drift modification circuit is configured to identify a plurality of levels of the initial temperature reading during the operation time period. Each level of the initial temperature reading may be associated with a given current operating time point within the operation time period. The given current operating time indicates a time at which the thermocouple generated and output a part of the temperature reading, where the current operating time represents an amount of time that has elapsed since the start of the operation time period.

In addition, for each level of an initial temperature reading output by a thermocouple, the temperature drift compensation circuit is configured to identify a temperature drift compensation value from the model. For example, for a given level of an initial temperature reading, the temperature drift compensation circuit may apply a corresponding effective time to the model to determine a corresponding temperature drift compensation value. The temperature drift compensation circuit may determine the effective time to be a time relative to an end time of the pre-aging process from which the model, including the time-based exponential expression, was derived. For example, the effective time may be, or may be based on, a sum of the duration of the pre-aging time period and an elapsed operation time as indicated by the current operating time associated with the current level. Upon determining the effective time, the temperature drift compensation circuit may apply the effective time to the model to determine a corresponding temperature drift value. The temperature drift compensation circuit may then modify or offset the level of the initial temperature reading with the corresponding temperature drift value, such as by adding or subtracting them together, in order to determine a modified temperature level associated with the given current time.

The temperature drift compensation circuit may continuously operate in this manner as it continuously receives initial temperature readings from the thermocouple, such as in the form of an analog or digital voltage signal.

To illustrate, suppose a thermocouple has been operating in a field of operation (e.g., within a turbine engine) for 5 hours since the start of an operation time period. Further, suppose a duration of a pre-aging time period was 50 hours—i.e., the thermocouple was subjected to a pre-aging process for 50 hours before it was implemented into the field of operation. During operation, the drift compensation circuit identifies an initial reading of 800 degrees Celsius from the thermocouple at the 5 hour time point. Rather than apply the current operating time of 5 hours to the model, the drift compensation circuit applies an effective time of 55 hours (50 hours of pre-aging time plus the 5 hours of field operation time), or some other time value based on the sum of the pre-aging time and the field operation time, to the temperature drift model to determine a temperature drift value corresponding to the effective time of 55 hours.

In furtherance of the illustration, suppose for example that the model provides a temperature drift value, corresponding to the effective time of 55 hours, of 30 degrees Celsius, indicating that the thermocouple, after operating for 55 hours, is modeled to have a temperature drift of 30 degrees. The temperature drift compensation circuit may then modify the initial temperature reading of 800 degrees at the 5 hour operating time point by the 30 degree temperature drift value corresponding to 55 hours. For example, suppose the temperature drift compensation circuit functions under the assumption that the temperature drift of the thermocouple lowers the initial temperature reading, in which case the temperature drift compensation circuit compensates for the temperature drift by adding the 30 degrees temperature drift value to the 800 degree initial temperature reading. In turn, the temperature drift compensation circuit outputs a modified temperature reading indicating 830 degrees, rather than 800 degrees, which (ideally) is closer to the actual operating temperature at the 5 hour operating time point, compared to the 800 degrees that the thermocouple actually measured.

FIGS. 5-8 show various example embodiments of a temperature sensor system that includes one or more pre-aged thermocouples and one or more temperature drift compensation circuits configured to output one or more modified temperature readings. A pre-aged thermocouple is a thermocouple that was subjected to a pre-aging process for a pre-aging time period, such as described with reference to blocks 302 and 304 of FIG. 3, prior to being implemented in a field of operation.

Figure 5:
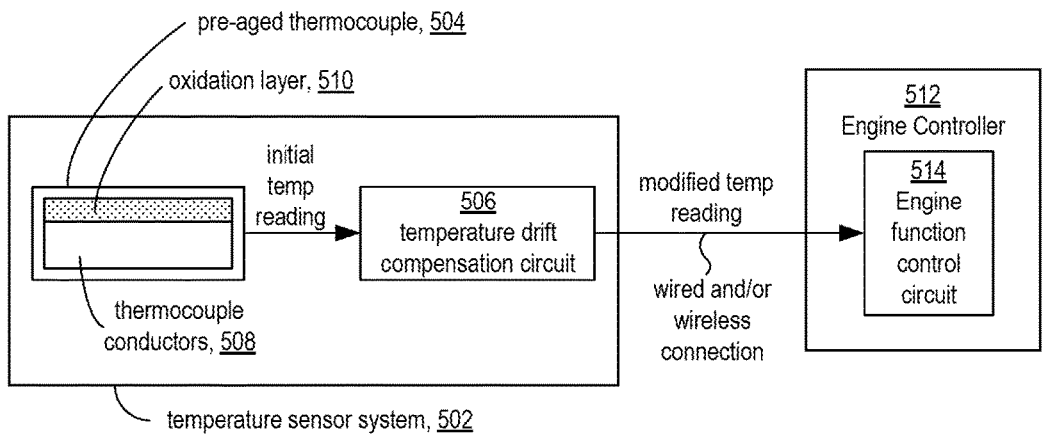
FIG. 5 is a block diagram of an example embodiment of a temperature sensor system.

Referring particularly to FIG. 5, a temperature sensor system 502 includes a thermocouple 504 and a temperature drift compensation circuit 506. The pre-aged thermocouple 504 includes a set or pair of conductors 508 comprising conductive materials corresponding to a type of the thermocouple 504 (e.g. a Type K thermocouple), and an oxidation layer 510 formed as a result of the pre-aging process. In various embodiments, the thermocouple 504 and the temperature drift compensation circuit 506 may be part of a same housing or protective covering, such as the conductors 508 with the oxidation layer 510 and the temperature drift compensation circuit 506 may be considered one, integral thermocouple unit or element.

During operation, the thermocouple 504 outputs an initial temperature reading to the temperature drift compensation circuit 506. In response, the temperature drift compensation circuit 506 modifies the initial temperature reading according to a model including a time-based exponential expression, and outputs a modified temperature reading based on the modification.

For at least some applications, the temperature system 502 may be implemented in a section of a gas turbine engine, such as the turbine section 110, the intake section 120, the combustion section 130, the exhaust section 150, and/or the compressor section 160 of the gas turbine section 100 of FIG. 1, as previously described. For such applications, the engine 100 may include, or otherwise be coupled to, an engine controller 512 configured to control one or more of various functions of the gas turbine engine. As indicated in FIG. 5, the engine controller 512 may include an engine function control component, sub-controller, or control circuit 514 that controls one or more functions, such as fuel delivery as a non-limiting example, based on the modified temperature reading generated by the temperature sensor system 502. As shown in FIG. 5, the temperature sensor system 502, including the temperature drift compensation circuit 506, may be coupled to the engine controller 512, including the engine function control circuit 514, via a wired and/or wireless connection, and send the modified temperature reading to the engine controller 512 over the wired and/or wireless connection. In turn, the engine function control circuit 514 may control one or more engine functions based on the modified temperature reading generated by the temperature drift compensation circuit 506.

Figure 6:
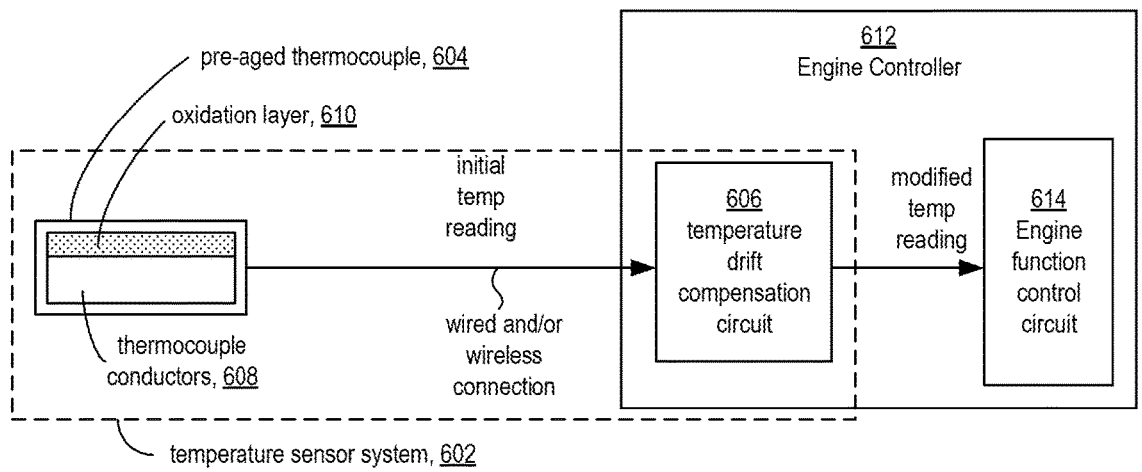
FIG. 6 is a block diagram of another example embodiment of a temperature sensor system.

FIG. 6 shows another example embodiment of a temperature sensor system 602, where a temperature drift compensation circuit 606 is a component of an engine controller 612. For example, the engine controller 612 may include memory storing the model and computer instructions or code that, when executed by a computer processor, causes the computer processor to determine a temperature drift and a modified temperature readings in response to receipt of an initial temperature reading according to the model. For such embodiments, a pre-aged thermocouple 604, including thermocouple conductors 608 and a oxidation layer 610, may output an initial temperature reading to the engine controller 612, such as via a wired and/or wireless connection, for generation of the modified temperature reading. Within the engine controller 612, the temperature drift compensation circuit 606 may send the modified temperature reading to an engine function control circuit 614, which controls one more engine functions based on the modified temperature reading.

Figure 7:
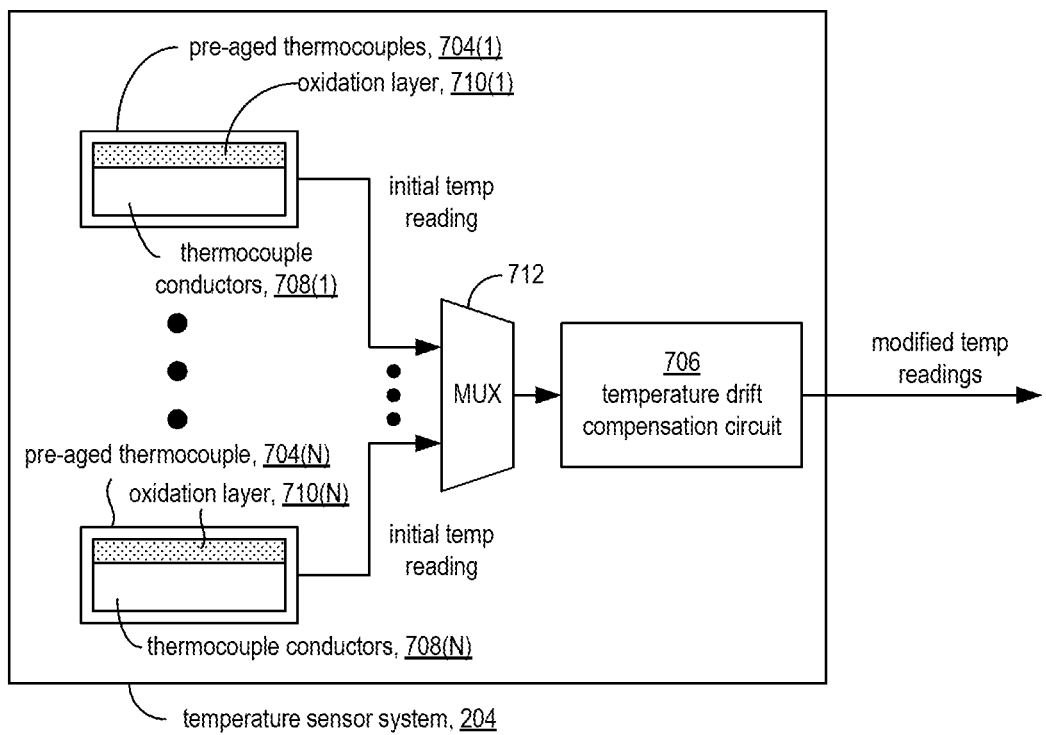
FIG. 7 is a block diagram of a third example embodiment of a temperature sensor system.

FIG. 7 shows an example embodiment of a temperature sensor system 702 that includes a plurality or N-number (where N is an integer of 2 or more) of pre-aged thermocouples 704(1) to 704(N) and a temperature drift compensation circuit 706. Each thermocouple 704 includes an associated set or pair of conductors 708, and an oxidation layer 710 formed from a pre-aging process. Each of the thermocouples 704 may output their respective initial temperature readings to the temperature drift compensation circuit 706 by way of a multiplexer (MUX) 712, which may perform time multiplexing to alternatingly output the initial temperature readings to the temperature drift compensation circuit 706. In turn, the temperature drift compensation circuit 706 may alternatingly or sequentially modify initial temperature readings from each of the pre-aged thermocouples 704, and output the modified temperature readings, such as to an engine function control circuit of an engine controller, as previously described with reference to FIGS. 5 and/or 6.

Figure 8:
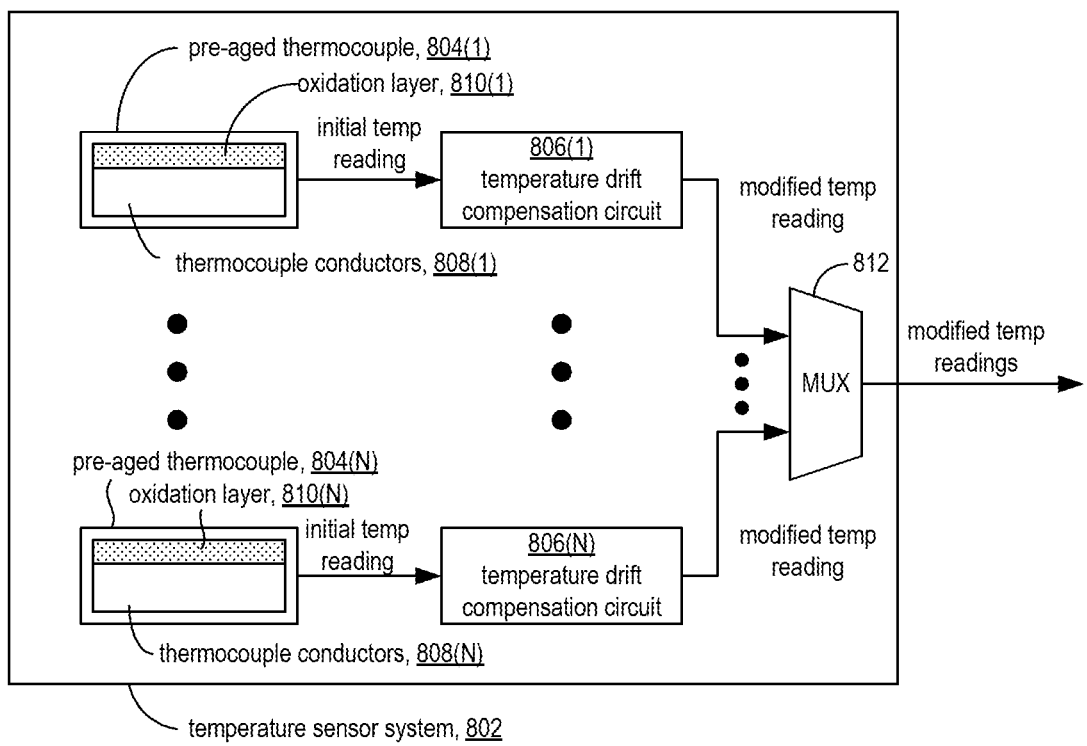
FIG. 8 is a block diagram of a fourth example embodiment of a temperature sensor system.

FIG. 8 shows an example embodiment of a temperature sensor system 802 that includes a plurality or N-number of pre-aged thermocouples 804(1) to 804(N), each including conductors 808 and an oxidation layer 810 formed from a pre-aging process. In contrast to the embodiment of FIG. 7, the embodiment of FIG. 8 includes a plurality or N-number of temperature drift compensation circuits 806(1) to 806(N), each associated with and configured to receive an initial temperature reading from a respective one of the pre-aged thermocouples 804. Accordingly, each temperature drift compensation circuit 806 is configured to modify a respective initial temperature reading from one of the pre-aged thermocouples 804 according to a model including a time-based exponential expression, and output a respective modified temperature reading. As shown in FIG. 8, the temperature sensor system 802 may include a multiplexer (MUX) 812 configured to receive the modified temperature readings from the temperature drift compensation circuits 806, and perform time multiplexing to alternatingly output the modified temperature readings, such as to an engine function control circuit of an controller, as previously described with reference to FIGS. 5 and/or 6.

FIG. 9 is a block diagram of an example controller 900 configured to carry out the actions or functions performed by a controller, such as the temperature controller 206, the pressure controller 208, the time controller 210, the drift modeling controller 216, and the engine controller 512/612, and/or a controller configured to perform some or all of the actions of the pre-aging method 300 of FIG. 3. In general, the controller 900 is an electronic device, such an electronic circuit, or system or network of electronic devices or electronic circuits, implemented in hardware or a combination of hardware and software. In the block diagram, the controller 900 includes a processor 902 and a memory 904. In general, the processor (or processor circuitry) 902 is a component of the controller 900, implemented in hardware alone, or as a combination of hardware and software, that is configured to perform the electronic functions described herein. In various embodiments where the controller 900 uses software to perform or carry out a given function, the function may have associated computer code or a set of computer instructions, stored in at least a portion of the memory 904. The processor 902 is configured, such as a microprocessor, a central processing unit (CPU), or the like, to access the memory 904 and execute the computer code/instructions in order to carry out the function. Also, in various embodiments the controller 900 may use hardware only, such as in the form of digital logic circuitry or the like, to perform a given function. Accordingly, in any of various embodiments, to perform the functions described herein, the processor 902 may use hardware circuitry only to perform functions, execute computer software code/instructions stored in the memory 904 to perform functions, or a combination thereof. In various embodiment, the controller 900 may be or include an integrated circuit (IC), an application specific integrated circuit (ASIC), a field programmable gate array (FPGA), a circuit, a digital logic circuit, an analog circuit, a combination of discrete circuits, gates, or any other type of hardware or combination thereof.

In addition, the memory 904 may be implemented according to any of various types of memory configured to store electronic data, including volatile memory, non-volatile memory, combinations therefore, or any other types of memory configured to store data, such in the form of digital bits of information. For example, in various embodiments, the memory 904 may store one or more models, each modeling temperature drift of a thermocouple as a function of time, and including at least one time-based exponential expression. In addition or alternatively, the memory 904 is configured to store data values of measured data, such as measured temperature values and/or measured drift values, as previously described. In addition or alternatively, in various embodiments, the memory 904 may store computer code or instructions that the processor 902 is configured to execute in order to carry out one or more of the functions described herein. For example, the memory 904 may store one or more computer-implemented algorithms configured to determine or generate a temperature drift model, including determining one or more constant values of the temperature drift model, based on measured temperature drift values. As another example, the memory 904 may store one or more algorithms configured to determine temperature drift values according to a model including a time-based exponential expression and for given time inputs.

Also, in various embodiments, the controller 900 may be, or may be a component of, an electronic device operable by a user, such as a desktop computer, a laptop computer, a smartphone, a tablet computer, a server, or a network of such devices interconnected together through using any of various forms of wired and/or wireless connections, as non-limiting examples. Accordingly, in various embodiments, the processor 902 may be configured locally with the memory 904. In other embodiments, the memory 904 may be configured remotely from the processor 902, such as part of a remote server for example, and the processor 902 may be configured to communicate with the memory 904 over a network, such as the Internet or WiFi for example, in order to access data stored in the memory 904.

Also, in various embodiment, the controller 900 may be electronically coupled to, or in some embodiments include, an electronic display, configured to display any of various electronic information, non-limiting examples of which include a liquid crystal display (LCD), a light emitting diode (LED) display, a touchscreen display on a mobile device, or any other of various types of electronic displays. Through the display 906, the controller 900 may be configured to display, to a user, any of various types of information, such as plots, graphs, or listings of measured data values, temperature readings, pressure readings, temperature drift curves or models, or determined constants for temperature drift models, as non-limiting examples.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A thermocouple drift compensation method comprising:
    positioning a thermocouple in a chamber;
    during a pre-aging time period that the thermocouple is positioned in the chamber:
        controlling a temperature of the chamber;
        recording a plurality of temperature readings of the thermocouple at a plurality of times during the pre-aging time period;
        calculating a temperature drift of the thermocouple over the pre-aging time period based on the plurality of temperature readings;
        determining a model of the calculated temperature drift, the model comprising a time-based exponential expression; and
    configuring a thermocouple compensation circuit with the model.
2. The method of aspect 1, further comprising: during the pre-aging time period, controlling a pressure of the chamber.
3. The method of aspect 2, wherein controlling the pressure comprises controlling a partial pressure of oxygen.
4. The method of aspect 2, wherein controlling the temperature and the pressure comprises controlling the temperature and the pressure each in respective ranges corresponding to an oxidation growth on a set of conductors of the thermocouple.
5. The method of aspect 4, wherein the oxidation growth is of a predetermined oxide comprising nickel oxide (NiO), nickel-hydroxide ($Ni(OH)^2$), silicon-dioxide ($SiO_2$), or chromium oxide ($Cr_2O_3$).
6. The method of any of aspects 1 to 5, wherein the pre-aging time period comprises a predetermined time period independent of a measured amount of an oxidation growth on a set of conductors of the thermocouple.

7. The method of any of aspects 1 to 5, wherein the pre-aging time period depends on a measured amount of oxidation growth on a set of conductor elements of the thermocouple.

8. The method of any of aspects 1 to 7, wherein the temperature is greater than or equal to about 500 degrees Celsius during the pre-aging time period.

9. The method of any of aspects 1 to 8, wherein the temperature is in a range between about 800 degrees Celsius and about 1200 degrees Celsius during the pre-aging time period.

10. The method of any of aspects 1 to 9, wherein the pre-aging time period is in a range between about 48 hours and about 120 hours.

11. The method of any of aspects 1 to 10, wherein determining the model of the calculated temperature drift comprises: determining at least one of: a constant of an exponential component of the time-based exponential expression, a constant of a base component of the time-based exponential expression, or a constant by which the time-based exponential expression is multiplied.

12. The method of any of aspects 1 to 11, wherein a time component of the model is part of an exponential component of the time-based exponential expression.

13. The method of any of aspects 1 to 11, wherein a time component of the model is part of a base component of the time-based exponential expression.

14. A temperature sensor system comprising:
a pre-aged thermocouple comprising an oxidation layer, the pre-aged thermocouple configured to generate an initial temperature reading; and
a temperature drift compensation circuit configured to:
receive the initial temperature reading from the pre-aged thermocouple;
modify the initial temperature reading to generate a modified temperature reading, the modification according to a time-based exponential expression; and
output the modified temperature reading.

15. The temperature sensor system of aspect 14, wherein the temperature drift compensation circuit, in order to modify the initial temperature reading, is configured to identify a current time to apply to the time-based exponential expression relative to an end time of a pre-aging process from which the time-based exponential expression is derived.

16. The temperature sensor system of aspects 14 or 15, wherein the time-based exponential expression corresponds to a modeled temperature drift of the pre-aged thermocouple during growth of the oxidation layer on a set of conductor elements of the pre-aged thermocouple.

17. The temperature sensor system of any of aspects 14 to 16, wherein the temperature drift compensation circuit configured to send the modified temperature reading to an engine controller of an engine via at least one of a wired or a wireless electrical connection.

18. The temperature sensor system of aspects 14-16 or 18-19, wherein the temperature drift compensation circuit is a component of an engine controller, the engine controller configured to receive the initial temperature reading from the thermocouple via at least one of a wired connection or a wireless connection.

19. The temperature sensor system of any of aspects 14 to 18, further comprising: a plurality of pre-aged thermocouples,
wherein the temperature drift compensation circuit is configured to:
receive a plurality of initial temperature readings, each from a respective one of the plurality of pre-aged thermocouples; and
modify each of the plurality of initial temperature readings according to the time-based exponential expression to generate a plurality of modified temperature readings.

20. The temperature system of any of aspects 14 to 18, further comprising: a plurality of pre-aged thermocouples and a plurality of temperature drift compensation circuits, each temperature drift compensation circuit configured to:
receive a respective initial temperature reading from a respective one of the plurality of pre-aged thermocouples;
modify the respective initial temperature reading to generate a respective modified temperature reading, the respective modification according to a respective time-based exponential expression; and output the respective modified temperature reading.

What is claimed is:

1. A thermocouple drift compensation method comprising:
positioning a thermocouple in a chamber configured to be subjected to temperatures greater than 800 degrees Celsius;
during a pre-aging time period that the thermocouple is positioned in the chamber and forms an oxidation growth:
controlling a temperature of the chamber; and
recording a plurality of temperature readings of the thermocouple at a plurality of times during the pre-aging time period;
calculating a temperature drift of the thermocouple over the pre-aging time period based on the plurality of temperature readings;
determining a model of the calculated temperature drift, the model comprising a time-based exponential expression; and
configuring a thermocouple compensation circuit with the model.

2. The method of claim 1, further comprising: during the pre-aging time period, controlling a pressure of the chamber.

3. The method of claim 2, wherein controlling the pressure comprises controlling a partial pressure of oxygen.

4. The method of claim 2, wherein controlling the temperature and the pressure comprises controlling the temperature and the pressure each in respective ranges corresponding to the oxidation growth on a set of conductors of the thermocouple.

5. The method of claim 4, wherein the oxidation growth is of a predetermined oxide comprising nickel oxide (NiO), nickel-hydroxide (Ni(OH)$^2$), silicon-dioxide (SiO$_2$), or chromium oxide (Cr$_2$O$_3$).

6. The method of claim 1, wherein the pre-aging time period comprises a predetermined time period independent of a measured amount of the oxidation growth on a set of conductors of the thermocouple.

7. The method of claim 1, wherein the pre-aging time period depends on a measured amount of the oxidation growth on a set of conductor elements of the thermocouple.

8. The method of claim 1, wherein the temperature is greater than or equal to about 500 degrees Celsius during the pre-aging time period.

9. The method of claim 8, wherein the temperature is in a range between about 800 degrees Celsius and about 1200 degrees Celsius during the pre-aging time period.

10. The method of claim 1, wherein the pre-aging time period is in a range between about 48 hours and about 120 hours.

11. The method of claim 1, wherein determining the model of the calculated temperature drift comprises: determining at least one of: a constant of an exponential component of the time-based exponential expression, a constant of a base component of the time-based exponential expression, or a constant by which the time-based exponential expression is multiplied.

12. The method of claim 1, wherein a time component of the model is part of an exponential component of the time-based exponential expression.

13. The method of claim 1, wherein a time component of the model is part of a base component of the time-based exponential expression.

14. A temperature sensor system comprising:
a pre-aged thermocouple comprising an oxidation layer, the pre-aged thermocouple configured to generate an initial temperature reading; and
a temperature drift compensation circuit configured to:
receive the initial temperature reading from the pre-aged thermocouple;
modify the initial temperature reading to generate a modified temperature reading, the modification according to a time-based exponential expression of a modeled temperature drift of the pre-aged thermocouple determined using a chamber configured to be subjected to temperatures greater than 800 degrees Celsius; and
output the modified temperature reading.

15. The temperature sensor system of claim 14, wherein the temperature drift compensation circuit, in order to modify the initial temperature reading, is configured to identify a current time to apply to the time-based exponential expression relative to an end time of a pre-aging phase from which the time-based exponential expression is derived.

16. The temperature sensor system of claim 14, wherein the time-based exponential expression corresponds to the modeled temperature drift of the pre-aged thermocouple during growth of the oxidation layer on a set of conductor elements of the pre-aged thermocouple.

17. The temperature sensor system of claim 14, wherein the temperature drift compensation circuit configured to send the modified temperature reading to an engine controller of an engine via at least one of a wired or a wireless electrical connection.

18. The temperature sensor system of claim 14, wherein the temperature drift compensation circuit is a component of an engine controller, the engine controller configured to receive the initial temperature reading from the thermocouple via at least one of a wired connection or a wireless connection.

19. The temperature sensor system of claim 14, further comprising: a plurality of pre-aged thermocouples,
wherein the temperature drift compensation circuit is configured to:
receive a plurality of initial temperature readings, each from a respective one of the plurality of pre-aged thermocouples; and
modify each of the plurality of initial temperature readings according to the time-based exponential expression to generate a plurality of modified temperature readings.

20. The temperature system of claim 14, further comprising: a plurality of pre-aged thermocouples and a plurality of temperature drift compensation circuits, each temperature drift compensation circuit configured to:
receive a respective initial temperature reading from a respective one of the plurality of pre-aged thermocouples;
modify the respective initial temperature reading to generate a respective modified temperature reading, the respective modification according to a respective time-based exponential expression; and
output the respective modified temperature reading.

* * * * *